United States Patent [19]

Endo et al.

[11] 4,273,754
[45] Jun. 16, 1981

[54] PROCESS FOR PRODUCING AQUEOUS SOLUTION OF CALCIUM NITRITE

[75] Inventors: Makoto Endo; Kohji Kusahara, both of Fuchumachi, Japan

[73] Assignee: Nissan Chemical Industries Ltd., Tokyo, Japan

[21] Appl. No.: 138,667

[22] Filed: Apr. 9, 1980

[51] Int. Cl.$^3$ .............................................. C01B 21/20
[52] U.S. Cl. ..................................... 423/385; 423/235
[58] Field of Search ................................ 423/235, 385

[56] References Cited

U.S. PATENT DOCUMENTS 4,208,391  6/1980  Endo et al. ......................... 423/385

FOREIGN PATENT DOCUMENTS 2839832  3/1979  Fed. Rep. of Germany .

Primary Examiner—O. R. Vertiz
Assistant Examiner—Wayne A. Langel
Attorney, Agent, or Firm—Oblon, Fisher, Spivak, McClelland & Maier

[57] ABSTRACT

An aqueous solution of calcium nitrite having high purity and high concentration is obtained by contacting a nitrogen oxides containing gas with an aqueous slurry of calcium hydroxide.

It is necessary to use the aqueous slurry having high calcium hydroxide content such as 20 to 40 wt. %, whereby it is necessary to feed the gas having high nitrogen oxides concentration such as 5 to 12 vol. % to give high conversion to calcium nitrite. In order to prevent a formation of a by-product of calcium nitrate, a nitrogen oxides containing gas having 5 to 12 vol. % of a nitrogen oxides concentration and 1.5 to 2.5 of a molar ratio of $NO/NO_2$ is fed under a high pressure enough to prevent a condensation of said slurry as a first stage and then, the unabsorbed gas is oxidized and the resulting gas having 1 to 5 vol. % of a nitrogen oxides concentration and 1.6 to 2.5 of molar ratio of $NO/NO_2$ is fed to the aqueous slurry having 2 to 12 wt. % of a calcium hydroxide obtained in the first stage so as to convert the residual calcium hydroxide to calcium nitrite without forming a by-product of calcium nitrate. The process is carried out as continuous process having a first reaction zone and a second reaction zone.

6 Claims, No Drawings

PROCESS FOR PRODUCING AQUEOUS SOLUTION OF CALCIUM NITRITE

BACKGROUND OF THE INVENTION

1. Field of the Invention

The present invention relates to an improved process for producing an aqueous solution of calcium nitrite by contacting a nitrogen oxides containing gas which contains NO and $NO_2$ with an aqueous slurry of calcium hydroxide to absorb the gas.

2. Description of the Prior Art

Heretofore, calcium nitrite has been used as an anticorrosive agent and an additive for a cement etc. In industrial usages, calcium nitrite is preferably used in a form of an aqueous solution rather than a solid form, and especially in a form of an aqueous solution having about 30 to 40 wt. % of calcium nitrite.

The aqueous solution of calcium nitrite can be easily obtained by dissolving a solid calcium nitrite into water. The commercially available solid calcium nitrite is obtained by concentrating and drying an aqueous solution of calcium nitrite and accordingly, the method of dissolving the solid calcium nitrite is in remarkably low efficiency.

It has been proposed to produce an aqueous solution of calcium nitrite in Japanese Patent Publication No. 35596/1976. However, the known process requires many complicated steps such as filtration, an aging, a concentration, a second filtration, and a second concentration, etc. to be low efficiency and to give large loss of the starting materials of a nitrogen oxides gas and an aqueous slurry of calcium hydroxide, disadvantageously.

The inventors have studied to attain a process for producing an aqueous solution of calcium nitrite having high purity and high concentration from a nitrogen oxides containing gas and an aqueous slurry of calcium hydroxide, and have found the fact that a formation of a by-product of calcium nitrate can be prevented by contacting a gas having less than about 3 vol. % of a nitrogen oxides concentration with an aqueous slurry having 3 to 10 wt. % of a calcium hydroxide content and containing calcium nitrite to absorb it whereby calcium nitrite is produced at high efficiency.

The inventors have studied and found a process for producing an aqueous solution of calcium nitrite by (1') a step of contacting a nitrogen oxides containing gas having 5 to 10 vol. % of a nitrogen oxides concentration and 1.2 to 1.5 of a molar ratio of $NO/NO_2$ with an aqueous slurry having 20 to 40 wt. % of a calcium hydroxide content at 40° to 70° C. until reducing the calcium hydroxide content in a range of 3 to 10 wt. % as a first stage and (2') a step of separating the unabsorbed and unreacted gas and oxidizing the separated gas to form a gas having 1 to 3 vol. % of a nitrogen oxides concentration and 1.2 to 1.5 of a molar ratio of $NO/NO_2$ and (3') a step of contacting the resulting gas having low nitrogen oxides concentration with the separated aqueous slurry having 3 to 10 wt. % of a calcium hydroxide content and containing calcium nitrite at 40° to 70° C. to reduce the calcium hydroxide content to be less than 3 wt. % as a second stage and (4') a step of filtering the resulting solution having high calcium nitrite concentration.

In order to produce a large amount of an aqueous slurry of $Ca(NO_2)_2$ having a high purity of higher than 95% at a high concentration of higher than 30% for example, a rate of several thousands tons per year, a large apparatus is required. In order to maintain the temperature of the reaction slurry at 40° to 70° C. in the absorption of a gas containing nitrogen oxides (a molar ratio of $NO/NO_2$ of 1.2 to 1.5) at higher than 150° C. obtained by the oxidation of ammonia into an aqueous slurry of slaked lime having a concentration of 20 to 40%, it is necessary to use a large cooler for cooling and a large reactor for oxidation of the discharged gas from the first reactor.

It is important to overcome these disadvantages.

The efficiency for cooling can be improved by raising the reaction temperature, however, when the reaction temperature is higher than 70° C. under atmospheric pressure, a partial pressure of steam of the slurry is higher than the partial pressure of steam in the gas containing nitrogen oxides whereby a concentration of the slurry caused by evaporation of steam is resulted and the complex $Ca(NO_2)_2.Ca(OH)_2.2H_2O$ is precipitated to increase the viscosity of the slurry. Therefore, the reaction is not smoothly performed.

The inventors have further studied to prevent a concentration of the slurry and have found that calcium nitrate as a by-product is increased in the reaction and accordingly, an aqueous solution of calcium nitrite having high purity (higher than 95%) could not be obtained. On the other hand, the inventors have found the fact that even though a solubility of slaked lime is decreased depending upon raising the temperature, the reaction velocity is substantially the same. Moreover, the inventors have found the fact that the increase of calcium nitrate as a by-product and the concentration of the slurry can be prevented by absorbing a gas containing nitrogen oxides (the molar ratio of $NO/NO_2$ is higher) under a higher pressure at a temperature of the slurry of higher than 70° C.

SUMMARY OF THE INVENTION

It is an object of the present invention to provide a process for producing an aqueous solution of calcium nitrite having high purity and high concentration of higher than 30 wt. % in high conversion of greater than 95%.

It is another object of the present invention to provide a process for producing an aqueous solution of calcium nitrite at high productivity by minimizing a capacity of a cooler and a reactor at higher temperature under higher pressure.

It is the other object of the present invention to provide a process for producing an aqueous solution of calcium nitrite having high purity and high concentration in high efficiency by combining simple steps from an aqueous slurry of calcium hydroxide and a nitrogen oxides containing gas.

It is the other object of the present invention to provide a process for producing an aqueous solution of calcium nitrite having high purity and high concentration in high efficiency under as condition reducing loss of calcium hydroxide and nitrogen oxides gas.

The foregoing and other objects of the present invention have been attained by providing a process for producing an aqueous solution of calcium nitrite by contacting a nitrogen oxides containing gas with an aqueous slurry of calcium hydroxide, the improvement wherein a gas having a temperature of 190°–300° C. and having a nitrogen oxide concentration of 5 to 12 vol. % and a molar ratio of $NO/NO_2$ of 1.6 to 2.5 is contacted with the aqueous slurry having 20 to 40 wt. % of a calcium hydroxide content at 75° to 110° C. under a high pressure enough to prevent condensation of said slurry until the calcium hydroxide content is reduced to a range of 2 to 10 wt. % as a first stage; and the unabsorbed and unreacted gas is separated and the gas is oxidized at 85°–150° C. to form a gas having a nitrogen oxides concentration of 1 to 5 vol. % and a molar ratio of $NO/NO_2$ of 1.6 to 2.5 and the resulting gas is contacted with the aqueous slurry separated from the first stage and having 2 to 10 wt. % of a calcium hydroxide content and containing calcium nitrite, at 75° to 110° C. under a high pressure enough to prevent condensation of said slurry to reduce the calcium hydroxide content to less than 3 wt. % as a second stage and filtering the resulting solution.

DETAILED DESCRIPTION OF THE PREFERRED EMBODIMENTS

The first feature of the present invention is to react the aqueous slurry of calcium hydroxide with nitrogen oxides gas in two stages as the step (1) and the step (3), under different concentrations.

The second feature of the present invention is to reduce loss of calcium hydroxide and nitrogen oxide in the step (2) and the step (3).

The third feature of the present invention is to combine the steps (1), (2), (3) and (4), whereby the formation of a by-product of calcium nitrate is reduced and the conversion to calcium nitrite is increased to be greater than 95% to obtain an aqueous solution of calcium nitrite having high purity and high concentration in high efficiency.

In the process of the present invention, the conversion to calcium nitrite is given by a ratio of calcium nitrite to total of calcium nitrite and calcium nitrate.

The aqueous slurry of calcium hydroxide having high calcium hydroxide content can be easily obtained by dispersing a commercially available calcium hydroxide such as slaked lime into water.

When the calcium hydroxide content is less than 20 wt. %, the aqueous solution of calcium nitrite having high concentration as the object product of the present invention cannot be obtained, even though the steps (1), (2), (3) and (4) are combined.

When the calcium hydroxide content is greater than 40 wt. %, a viscosity of the slurry of the reaction mixture in the step (1) is too high because of a formation of a complex whereby the absorption of nitrogen oxides gas cannot be smoothly performed. Moreover, calcium nitrite is precipitated disadvantageously.

The gas having high nitrogen oxides concentration used in the present invention can be easily obtained by oxidizing ammonia with air, and usually has a pressure lower than 10 kg./cm² and a temperature higher than 150° C., preferably a temperature of 190°–300° C. It is important to give 1.6 to 2.5 of a molar ratio of $NO/NO_2$ to the gas.

When the molar ratio of $NO/NO_2$ is less than 1.6, the formation of the by-product of calcium nitrate is increased in the step (1) of contacting it with the aqueous slurry of calcium hydroxide to absorb it, whereby an aqueous solution of calcium nitrite having high purity cannot be obtained.

When the molar ratio of $NO/NO_2$ is greater than 2.5, the conversion of nitrogen oxides in the step (1) is decreased whereby an efficiency of the reaction becomes low.

It is not sufficient, however only to define the molar ratio of $NO/NO_2$ as the nitrogen oxides containing gas used in the step (1) and it is preferable to define the nitrogen oxides concentration in the gas to the specific range.

When the nitrogen oxides concentration is lower than about 5 vol. %, the conversion is decreased to be uneconomical from the viewpoint of the apparatus coefficiency.

When the nitrogen oxides concentration is higher, there is no trouble. However, it is preferable to obtain a nitrogen oxides containing gas having lower than 12 vol. % of a nitrogen oxides concentration by oxidizing ammonia in an industrial operation.

It is preferable to use the nitrogen oxides containing gas having high concentration but lower than 12 vol. % in the step (1) of the process of the invention.

The nitrogen oxides containing gas is fed at a temperature of 190° to 300° C. When it is lower than 150° C., a moisture in the gas is liquefied to result nitric acid and a by-product of calcium nitrate is produced. The liquefaction of the moisture in the gas can be prevented almost perfectly at a temperature higher than 190° C. However, when the temperature is higher than 300° C., the heat to be removed from the reaction zone according to the step (1) increases.

In the process of the present invention, it is necessary to maintain the temperature of the aqueous slurry at 75°–110° C. in the step (1) contacting the nitrogen oxides containing gas with the aqueous slurry of calcium hydroxide under higher pressure for example, 2.0 to 10 atm.

When the temperature is high, the formation of the complex can be prevented. However, the steam partial pressure of the aqueous slurry is higher than steam partial pressure of the nitrogen oxides containing gas at higher than 70° C. under atmospheric pressure, whereby the phenomenon of the concentration of the aqueous slurry is caused and the reaction contacting and absorbing nitrogen oxides gas is not smoothly performed, and preferably, the reaction according to the step (1) is carried out at a temperature of 75°–110° under a pressure of 2–10 kg./cm² in order enough to prevent condensation of the slurry.

In order to react at a temperature higher than 75° C., a molar ratio of $NO/NO_2$ is required as high as 1.6 to 2.5. Since the reaction temperature is high as 70° to 110° C., a production of calcium nitrate as a by-product is increased at a molar ratio of $NO/NO_2$ of less than 1.6. However, a conversion of nitrogen oxides is lower at a molar ratio of $NO/NO_2$ of greater than 2.5.

In the process of the present invention, it is necessary to separate continuously the unabsorbed and unreacted nitrogen oxides containing gas from the reaction mixture in the step (1) and to stop the feeding of the nitrogen oxides containing gas when the residual calcium hydroxide content is reduced in a range of 2 to 10 wt. % to stop the reaction.

When the residual calcium hydroxide content is greater than 10 wt. %, it takes a long time for the reaction in the step (3) to cause a low conversion even though a large volume of the nitrogen oxides containing gas having low concentration is contacted with the reaction mixture.

When the reaction is reached to be less than 2 wt. % of the residual calcium hydroxide content, the formation of the by-product of calcium nitrate is increased in the step (1), whereby it is difficult to obtain an aqueous solution of calcium nitrite having high purity.

Thus, an aqueous solution of calcium nitrite can be obtained in high efficiency and high processibility under preventing the formation of the by-product of calcium nitrate and the precipitation of the complex in the step (1). However, the resulting slurry of the reaction mixture in the step (1) contains 2 to 10 wt. % of calcium hydroxide. Accordingly, if the residual calcium hydroxide is separated from the aqueous slurry, loss of calcium hydroxide is caused and moreover, a concentration step is required for obtaining an aqueous solution of calcium nitrite having high concentration, whereby the simple process cannot be attained.

In the process of the present invention, the aqueous slurry of the reaction mixture containing calcium nitrite and having low calcium hydroxide content obtained in the step (1) is further contacted with a nitrogen oxides containing gas in the step (3) so as to overcome the above-mentioned disadvantages.

It is necessary, however to define a nitrogen oxides concentration in the nitrogen oxides containing gas used in the step (3).

As stated above, the inventors have studied and found the fact that when a nitrogen oxides containing gas is absorbed into an aqueous slurry having 2 to 10 wt. % of a calcium hydroxide content and containing the resulting calcium nitrite, the formation of the by-product of calcium nitrate is increased depending upon the increase of a nitrogen oxide concentration in the nitrogen oxides containing gas whereas the formation of the by-product of calcium nitrate is decreased and calcium nitrite is produced in high efficiency depending upon the decrease of a nitrogen oxide concentration. The nitrogen oxides concentration in the gas used in the step (3) is preferably lower than 5 vol. %. However, it is also not preferable to be too low concentration, because of slow speed of the production of calcium nitrite. It is suitable to be 1 to 5 vol. % of the nitrogen oxides concentration.

The molar ratio of $NO/NO_2$ in the gas having a low nitrogen oxides concentration used in the step (3) is preferably in a range of 1.6 to 2.5 on the same reason of the step (1).

The temperature of the slurry in the step (3) is preferably in a range of 75° to 110° C. on the same reason of the step (1). The reaction according to the step (3) is carried out under a pressure of 2–10 kg./cm² in order enough to prevent condensation of the slurry at a high reaction temperature of 75°–110° C.

In the step (3), calcium hydroxide is converted to calcium nitrite. In order to completely convert all of calcium hydroxide, it takes a long time to be unefficient as an industrial process. When nitrogen oxides gas is fed into a slurry having low concentration of calcium hydroxide for a long time, a by-product of calcium nitrate tends to be produced by reacting nitrogen oxides gas with the resulting calcium nitrite.

It is effective to stop the reaction under the condition remaining less than 3 wt. % preferably about 1 wt. % of calcium hydroxide in the reaction mixture obtained in the step (3). The unabsorbed and unreacted gas is discharged continuously from the reaction zone according to step (3). The discharged gas may, if desired, be used to manufacturing of the nitric acid, since the gas still has a high pressure sufficient to use for the manufacturing of the nitric acid.

The loss of nitrogen oxides can be prevented by utilizing a discharge gas containing unabsorbed nitrogen oxides discharged from the step (1), as the gas having a low nitrogen oxides concentration used in the step (3).

The step (2) is provided for this purpose.

The molar ratio of $NO/NO_2$ in the discharge gas which is not absorbed in the step (1) is usually higher than about 4. In order to control the molar ratio of $NO/NO_2$ in a range of 1.6 to 2.5, it is necessary to oxidize the unabsorbed discharge gas.

The oxidation can be easily carried out by using an oxidizing tower with 4 to 5 vol. % of oxygen contained in the unabsorbed discharge gas.

The oxidation can be easily performed by retaining the unabsorbed discharge gas in the oxidizing tower for a satisfactory time.

The concentration of nitrogen oxides can be easily attained by feeding nitrogen gas as desired. However, when a gas having 5 to 12 vol. % of a nitrogen oxides concentration is used as the gas having high nitrogen oxide concentration in the step (1), the nitrogen oxides concentration in the unabsorbed discharge gas in the step (1) is in a range of about 1 to 5 vol. % whereby the discharge gas can be used without a specific controlling treatment. As the gas discharged from the reaction zone according to the step (1) usually has a high pressure and temperature i.e. about 90°–130° C., it is convenient to maintain the gas at the high temperature and high pressure for using to the subsequent oxidation step (2), so as to be directly used to the reaction step (3) subsequent to the step (2). Moreover, the high pressure of the gas makes it possible to use an oxidation tower of small type or a pipe instead of the large tower formerly used.

In the control of the discharge gas, the oxidation is carried out at 80° to 150° C. and the gas is controlled to give the nitrogen oxides containing gas having a concentration of 1 to 5% and a molar ratio of $NO/NO_2$ of 1.6 to 2.5 so as to be used in the step (3).

In accordance with the process of the present invention combining the steps (1), (2) and (3), an aqueous solution having high calcium nitrite concentration can be obtained. However, the solution obtained in the step (3) contains a small amount of calcium hydroxide and insoluble impurities included in the starting materials. These insoluble materials are separated to obtain the aqueous solution of calcium nitrite having high purity and high concentration.

The solution obtained in the step (3) can be easily filtered whereby it is preferable to provide a filtering step as the step (4) for separating the insoluble impurities.

The process of the present invention can be a batch system and a semi-continuous system and a continuous system.

In a batch system, two large reactors are used. In the first reactor, the first stage of conversion of calcium hydroxide to calcium nitrite is performed and then in the second reactor, the unabsorbed discharge gas is fed to perform the second stage. Since the calcium hydroxide content in the first reactor is varied in the batch system, the balance of the reactions is not suitable.

Accordingly, it is preferable to use the continuous process.

Since it takes a long time for converting calcium hydroxide with nitrogen oxides to calcium nitrite, it is preferable to use two or more reactors in the continuous process, as follows, though a pipe line continuous process reacting through two pipe systems can be used, if desirable.

In the first reactor, the aqueous slurry of calcium hydroxide is fed from the upper part and the nitrogen oxides containing gas is fed from the lower part and the reaction mixture is discharged from the bottom.

The unabsorbed discharge gas can be separated in the reactor.

In the second reactor, the reaction mixture is fed from the upper part and the gas having low nitrogen oxides concentration is fed from the lower part and the reaction mixture is discharged from the bottom.

This continuous process can be shown as follows.

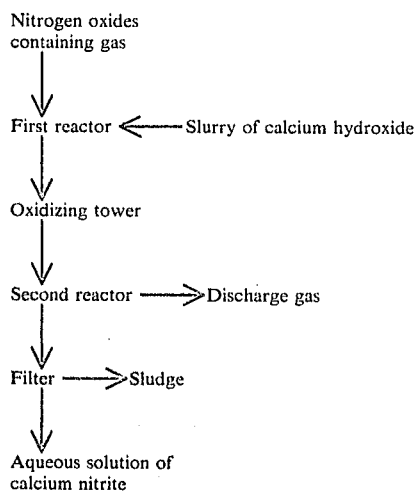

In said continuous system, the aqueous slurry having high calcium hydroxide content (20 to 40 wt. %) is continuously charged from the top and the gas having high nitrogen oxides concentration is continuously fed from the bottom of the first reactor under maintaining the calcium hydroxide content in a range of 2 to 10 wt. % to absorb the nitrogen oxide containing gas into the aqueous slurry of calcium hydroxide to react them. The reaction mixture is continuously transferred to the second reactor.

On the other hand, the unabsorbed nitrogen oxides containing gas discharged continuously from the first reactor is continuously fed to the oxidizing tower to oxidize nitrogen oxides to control the molar ratio of $NO/NO_2$. The resulting gas is continuously discharged from the tower and fed from the bottom of the second reactor to contact with the reaction mixture transferred from the first reactor to the second reactor. The resulting solution is continuously discharged from the bottom and is fed to the filter to filtrate it whereby the aqueous solution of calcium nitrite having high purity and high concentration can be continuously obtained.

In the other embodiment, the unabsorbed nitrogen oxides containing gas discharged in the step (3) is recovered and it is fed to the step (2') for controlling the molar ratio of $NO/NO_2$ and if necessary the concentration of nitrogen oxides as the step (2). The reaction mixture obtained in the step (3) is contacted with the gas having low nitrogen oxides concentration obtained in the step (2') to absorb the nitrogen oxides in the step (3') and the solution obtained int the step (3') is filtered.

As the same manner, multi-steps (2'') (2''') ... and (3'') (3''') ... can be added to perform the reaction of nitrogen oxides in the absorption until decreasing the calcium hydroxide content to less than 3 wt. %.

In the process of the present invention, the multisteps can be combined, however, it is optimum to combine the steps (1), (2), (3) and (4) in said simple manner, in order to carry out the process in high efficiency on the apparatus. The process according to the present invention is especially suitable for an industrial massive production in a large scale through a compact apparatus.

Thus, in accordance with the process of the present invention, the steps (1), (2), (3) and (4) are combined to obtain the aqueous solution of calcium nitrite having higher than 95 wt. % of a calcium nitrite concentration and having high purity in a yield of greater than 95%. This aqueous solution can be used as anticorrosive agent and additive for cement without any treatment.

A further understanding can be attained by reference to certain specific examples which are provided herein for purposes of illustration only and are not intended to be limiting in any manner, unless otherwise specified.

EXAMPLE 1

In a first reactor having a diameter of 2.0 m and a height of 3.8 m, a slurry containing 1750 kg. of slaked lime, 85 kg. of calcium nitrite and 4500 kg. of water was charged. From a porous nozzle equipped with a bottom of the tank, a gas containing nitrogen oxides of 9.4 vol. % obtained by an oxidation of ammonia with air (a molar ratio of $NO/NO_2$ of 1.7) and having a temperature of about 230° C. was fed at a flow rate of 1300 $Nm^3$/hr. to react them under a pressure of 2.8 kg./cm² for 8 hours. During the reaction, the reaction mixture was cooled to maintain at 78° to 83° C. and to maintain pH of higher than 11 whereby 8.5 tons of the reaction mixture containing 30.4 wt. % of calcium nitrite and 1.1 wt. % of calcium nitrate and 3.4 wt. % of calcium hydroxide was obtained. The unabsorbed gas was continuously discharged. A concentration of nitrogen oxides in the discharged gas was 2.0 vol. %.

The reaction mixture was transferred from the first reactor to the second reactor.

In the next batch reaction, all of the unabsorbed gas discharged from the first reactor was passed through a space tower to control a molar ratio of $NO/NO_2$ to 1.7 and was fed through the porous nozzle equipped at the bottom. The reaction was carried out at 75° to 80° C., pH of higher than 11, under a pressure of 2.5 kg/cm² for 8 hours. The unabsorbed gas was continuously discharged out of the reaction system, whereby 8.6 tons of the reaction mixture containing 34.0 wt. % of calcium, nitrite and 1.4 wt. % of calcium nitrate, 1.2 wt. % of calcium hydroxide and 1.4 wt. % of the other solid components was obtained. The concentration of nitrogen oxides in the discharged gas was 0.4 vol. %.

The reaction mixture was cooled and filtered to obtain an aqueous solution containing 33.1 wt. % of calcium nitrite and 1.5 wt. % of calcium nitrate.

EXAMPLE 2

In the first reactor used in Example 1, 8.5 tons of a slurry containing 29.5 wt. % of calcium nitrite, 1.1 wt. % of calcium nitrate and 4.0 wt. % of calcium hydroxide was charged and a slurry of slaked lime having a concentration of 29.8 wt. % was continuously fed at a rate of about 750 kg/hr. On the other hand, a gas containing nitrogen oxides of 9.4 vol. % obtained by an oxidation of ammonia with air (a molar ratio of NO/-

NO$_2$ of 1.7) and having a temperature of about 230° C. was fed at a flow rate of 1300 Nm$^3$/hr. to react them under a pressure of 2.8 kg./cm$^2$. During the reaction, the reaction mixture was cooled to maintain 78° to 83° C. and to maintain a concentration of calcium hydroxide in the reaction slurry to about 4 wt. %. The reaction mixture was continuously discharged from the first reactor at a rate of about 1,000 kg/hr. and was fed into the second reactor used in Example 1. The concentration of the unabsorbed nitrogen oxides discharged from the first reactor was about 1.9 vol. %.

All of the unabsorbed gas was passed through a space tower to control a molar ratio of NO/NO$_2$ to 1.7 and was fed into the second reactor to react them at 75° to 80° C. under a pressure of 2.5 kg/cm$^2$. The concentration of calcium hydroxide in the reaction mixture was maintained at 1.5 wt. %. The reaction mixture was continuously discharged from the second reactor at a rate of about 1,000 kg/hr. and cooled and filtered to obtain an aqueous solution containing 32.4 wt. % of calcium nitrite and 1.6 wt. % of calcium nitrate.

We claim:

1. In a process for producing an aqueous solution of calcium nitrite having high purity and high concentration by contacting a nitrogen oxides containing gas with an aqueous slurry of calcium hydroxide, the improvement wherein a gas having a temperature of 190°–300° C. and having a nitrogen oxide concentration of 5 to 12 vol. % and a molar ratio of NO/NO$_2$ of 1.6 to 2.5 is contacted with the aqueous slurry having 20 to 40 wt. % of a calcium hydroxide content at 75° to 110° C. under a pressure high enough to prevent condensation of said slurry until the calcium hydroxide content is reduced to a range of 2 to 10 wt. % as a first stage; and the unabsorbed and unreacted gas is separated and the gas is oxidized at 85°–150° C. to form a gas having a nitrogen oxides concentration of 1 to 5 vol. % and a molar ratio of NO/NO$_2$ of 1.6 to 2.5 and the resulting gas is contacted with the aqueous slurry separated from the first stage and having 2 to 10 wt. % of a calcium hydroxide content and containing calcium nitrite, at 75° to 110° C. under a pressure high enough to prevent condensation of said slurry to reduce the calcium hydroxide content to less than 3 wt. % as a second stage and filtering the resulting solution.

2. A process for producing an aqueous solution of calcium nitrite according to claim 1 wherein the nitrogen oxides containing gas used in the first stage is obtained by oxidizing ammonia and has a pressure in a range of 2 to 10 kg./cm$^2$.

3. A process for producing an aqueous solution of calcium nitrite according to claim 1 or 2 wherein the calcium hydroxide content of the aqueous solution obtained in the second stage is less than about 1 wt. %.

4. A continuous process for producing an aqueous solution of calcium nitrite having high purity and high concentration by contacting a nitrogen oxides containing gas with an aqueous slurry of calcium hydroxide which comprises (a) feeding continuously an aqueous slurry having 20 to 40 wt. % of slaked lime content and a nitrogen oxide containing gas having a temperature of 190°–300° C., a pressure of 2–10 kg/cm$^2$ and having a nitrogen oxides concentration of 5 to 12 vol. % and a molar ratio of NO/NO$_2$ of 1.6 to 2.5 obtained by oxidizing ammonia into a first reaction zone to contact them under conditions of temperature of 75° to 110° C. and a pressure high enough to prevent condensation of said slurry until the calcium hydroxide content is reduced to a range of 2 to 10 wt. %;

(b) discharging continuously the unabsorbed gas and the reaction mixture from the first reaction zone and separating and feeding continuously the reaction mixture to a second reaction zone and feeding continuously the unabsorbed gas into an oxidizing device at 85°–150° C.;

(c) oxidizing the unabsorbed gas in the oxidizing device at 85 degrees to 150 degree C. to control it to a nitrogen oxides concentration of 1 to 5 vol. % and a molar ratio of NO/NO$_2$ of 1.6 to 2.5, and feeding the resulting gas into the second reaction zone;

(d) contacting continuously the resulting gas with the aqueous slurry separated from the first reaction zone and having 2–10 wt. % of a calcium hydroxide content under conditions of temperature of 75° to 110° C. and a pressure high enough to prevent condensation of said slurry to reduce the calcium hydroxide content in the second reaction zone to less than 3 wt. %; and (e) discharging continuously the unabsorbed gas and the reaction mixture from the second reaction zone while separating and feeding continuously the reaction mixture to a filter to separate the remaining calcium hydroxide.

5. A process for producing an aqueous solution of calcium nitrite according to claim 4 wherein the calcium hydroxide content in the reaction mixture obtained in the second reaction zone is kept in less than about 1.5 wt. %.

6. A process for producing an aqueous solution of calcium nitrite according to any of claims 1, 2, 4 or 5 wherein calcium hydroxide as the starting material which is used in the first stage is a slaked lime.

* * * * *